United States Patent
Koenig et al.

[15] 3,688,416
[45] Sept. 5, 1972

[54] ARITHMETICAL TEACHING AID

[72] Inventors: Barbara Koenig, P.O. Box 48091, Niles, Ill. 60646; Christopher E. Pfannkuche, 7720 W. Greenleaf Ave., Chicago, Ill. 60648

[22] Filed: Aug. 31, 1970

[21] Appl. No.: 68,338

[52] U.S. Cl. .................................................35/31 R
[51] Int. Cl. ............................................G09b 19/02
[58] Field of Search .........35/31 R, 31 A, 31 B, 31 C, 35/30, 32; 235/168

[56] References Cited

UNITED STATES PATENTS 2,663,495  12/1953  Ramsell et al. .............235/168
3,226,533  12/1965  Beers ......................35/31 R X

*Primary Examiner*—Wm. H. Grieb
*Attorney*—Clarence A. O'Brien and Harvey B. Jacobson

[57] ABSTRACT

Numeral labeled indicator lamps are sequentially illuminated and extinguished on a panel to display addition or subtraction operation. The quantity added or subtracted is selected by a pulse transmitting dialing machine. A reversing switch controls the direction in which the pulse advances a step switch to sequentially operate the indicator lamp in an addition or subtraction mode.

9 Claims, 2 Drawing Figures

PATENTED SEP 5 1972

3,688,416

Barbara Koenig
Christopher E. Pfannkuche
INVENTORS

BY Clarence A. O'Brien
and Harvey B. Jacobson
Attorneys

ARITHMETICAL TEACHING AID

There are various arithmetical register devices which perform addition and subtraction operations. These devices are, however, rather complex in construction and operation and require a considerable amount of training and skill on the part of the operator. Accordingly, such devices are unsuitable as a training or teaching aid for relatively young children attempting to acquire arithmetical concepts. It is therefore an important object of the present invention to provide a teaching aid which is relatively simple to operate and which will display addition and subtraction operations without confusion.

In accordance with the present invention, an arithmetical teaching aid is provided which features a display panel on which a telephone type of dialing mechanism is mounted as well as a series of indicator lamps labeled by numerals. A mode control switch is displaceable between two operative positions labeled addition and subtraction so as to select the direction in which a step switch is advanced by an amount preselected by the number of pulses received from the dialing mechanism. Thus, illumination of the indicator lamps advances in one direction or the other to display addition or subtraction operations on the display panel.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
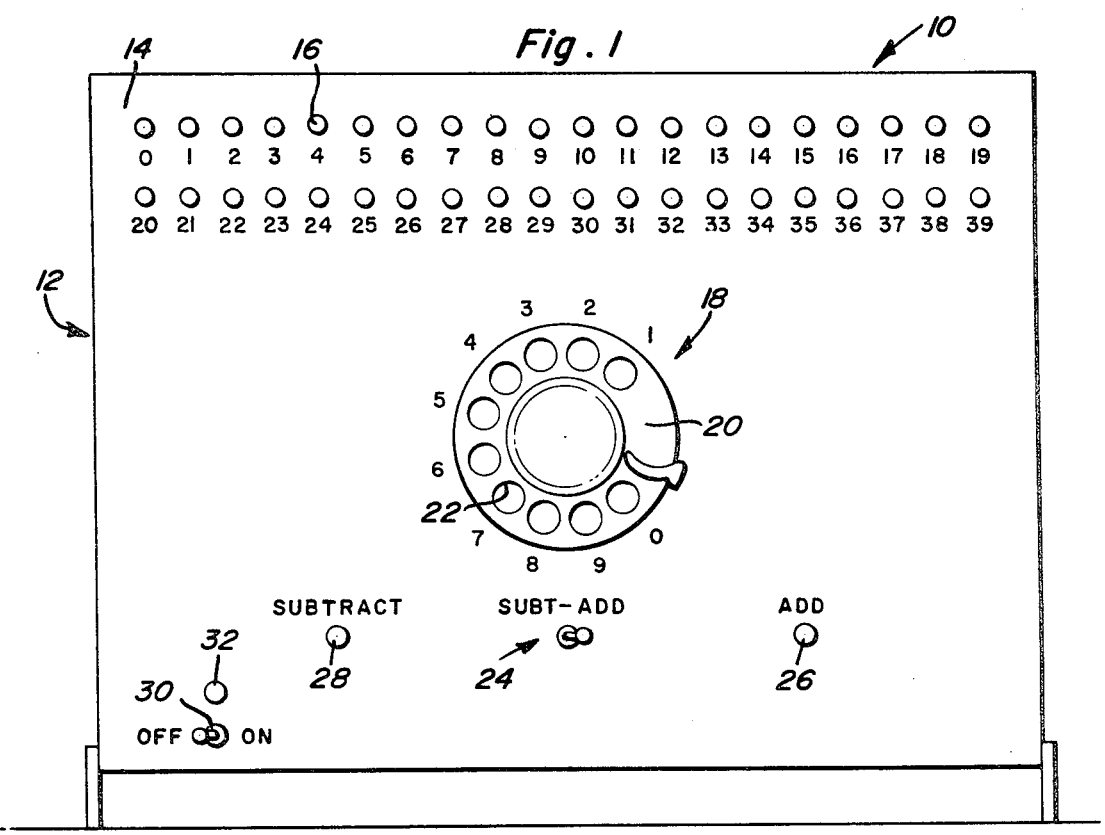
FIG. 1 is a front elevational view of a typical arithmetical teaching aid constructed in accordance with the present invention.

Referring now to the drawings in detail, FIG. 1 illustrates a typical arithmetical teaching aid constructed in accordance with the present invention and generally denoted by reference numeral 10. The teaching aid 10 may have a housing generally referred to by reference numeral 12 made in any desired shape. The housing will, however, include a display panel 14 on which a series of indicator lamps 16 are mounted. In the illustrated embodiment, two rows of lamps 16 are mounted adjacent the top of the panel and are designated by numerals 0 through 39. Thus, the arithmetical operations to be performed on the teaching aid 10 are limited in accordance with the limited capacity of the young children for which the teaching aid is designed. As will be explained in detail hereafter, the indicator lamps 16 are illuminated and extinguished in sequential order in order to display an addition operation or a subtraction operation depending upon direction in which energizing voltage is transferred from one lamp to another. For example, transfer of energizing voltage from one lamp to another in a right hand direction as viewed in FIG. 1 corresponds to an addition operation while transfer of the voltage in the left hand direction as viewed in FIG. 1 corresponds to a subtraction operation.

The quantity to be added or subtracted in the arithmetical operation is preselected by means of a pulse generating device in the form of a conventional telephone dialing mechanism generally referred to by reference numeral 18 centrally mounted on the display panel 14 as viewed in the FIG. 1 embodiment of the invention. Thus, the dialing mechanism 18 includes a finger wheel 20 having the usual finger receiving openings 22 aligned with numerals 1 through 0 so that the wheel 20 may be rotated a preselected amount in order to generate a selected number of pulses when released. In the illustrated embodiment, 10 pulses may be generated to thus limit the quantity to be added or subtracted in a single operation.

A mode control device in the form of a reversing switch 24 is displaceable between two operative positions in order to determine the arithmetical operation to be performed. Thus, the reversing switch device 24 when in the "add" position as illustrated in FIG. 1 will condition the apparatus for an addition operation. In the "add" position of the switch device 24, and "add" indicator lamp 26 will be illuminated so as to signify the operational mode of the apparatus 10. Similarly, a "subtract" indicator lamp 28 is illuminated when the switch device 24 is in the "subtract" position. The display panel 14 also mounts an on-off switch 30 and a replaceable fuse device 32 for the electrical circuitry enclosed within the housing 12.

Figure 2:
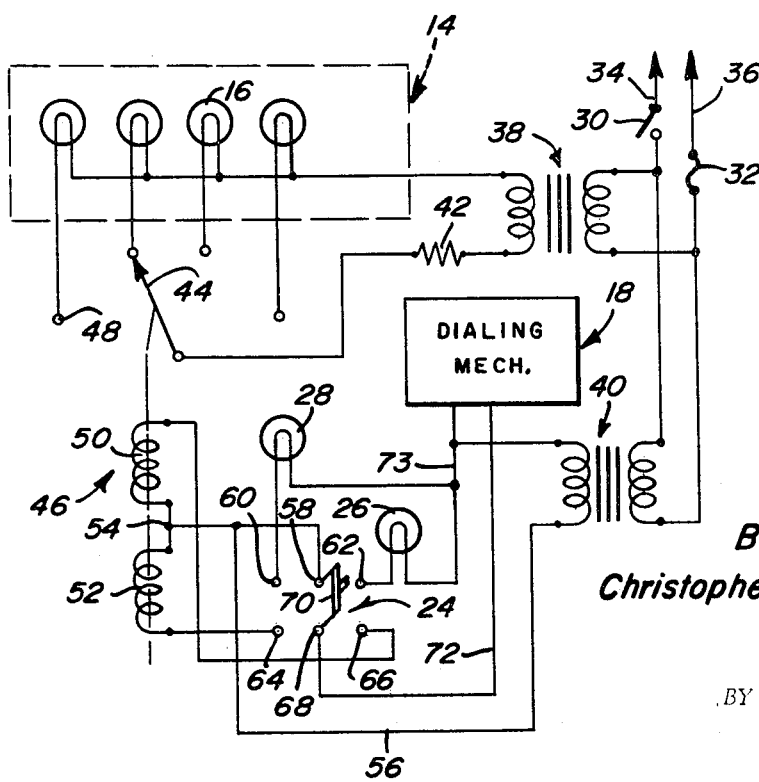
FIG. 2 is an electrical circuit diagram corresponding to the teaching device shown in FIG. 1.

Referring now to FIG. 2, the apparatus 10 is energized from the usual source of electrical energy such as a 117 VAC supply connected to the power lines 34 and 36. The power lines are respectively connected across the primaries of voltage step-down transformers 38 and 40 through on-off switch 30 and fuse 32. A relatively low voltage such as 6.3 volts is thereby applied from the secondary of transformer 38 through voltage reducing resistor 42 to the movable contact arm 44 of a step switch assembly 46 in order to sequentially illuminate and extinguish the indicator lamps 16. The step switch assembly accordingly includes a plurality of contacts 48 connected to each of the lamps 16 so that a circuit is completed across the secondary of transformer 38 through each lamp when its associated contact 48 is engaged by the contact arm 44. The contact arm is advanced in one direction or another in order to transfer the voltage from one lamp to another by means of actuator stepping coils 50 and 52 which are interconnected at a common terminal 54. The common terminal 54 is connected through conductor 56 to one side of the secondary of transformer 40 through which a relatively higher voltage is applied, such as 25 volts. This voltage is applied in pulse form to one of the stepping coils 50 and 52 under control of the dialing mechanism 18 and the mode control switch device 24. Thus, the common junction 54 between the stepping coils is connected to terminal 58 of the switch device 24 in order to establish an electrical connection to either contact 60 or 62 in one of the two operative positions of the switch device. The other contacts 64 and 66 of the switch device 24 are respectively connected to the terminals of the stepping coils 50 and 52 opposite the common junction 54. The other terminal 68 of the switch device 24 to which the movable contactor 70 is connected, is connected by conductor 72 to one output terminal of the dialing mechanism 18. The other output terminal of the dialing mechanism 18 is connected by conductor 73 to one side of "add" lamp 26, "subtract" lamp 28 and the secondary winding of transformer 40. The other sides of lamps 26 and 28 are connected to terminals 62 and 60 respectively in the switch device 24. Thus, when the switch arm 70 is displaced to its left hand operative position as viewed in FIG. 2, engaging contact 60 and 64, a circuit is completed through stepping coil 52 in series with dialing mechanism 18 across the secondary of transformer 40 in order to advance the switch arm 44 in the one direction to perform a subtraction operation. The stepping coil 52 is pulsed a number of times determined by the operation of dialing mechanism 18. During this subtraction operation, the lamp 28 will be continuously illuminated. On the other hand, when the switch arm 70 of the switch device 24 is displaced to its other operative position engaging contacts 62 and 66, the "addition" lamp 26 will be continuously illuminated and the output pulses of the dialing mechanism 18 will be applied to the stepping coil 50 in order to intermittently advance the switch arm 44 in the opposite direction to perform an addition operation.

From the foregoing description, operation and use of the teaching aid 10 will be apparent. The apparatus is placed in an operative position by displacing the on-off switch 30 to the "on" position. If addition is to be performed, the switch device 24 is displaced to its "add" position and indicator lamp 26 will be continuously illuminated. The dialing mechanism is then operated in order to select the number of pulses representing a quantity to be added. After a certain numeral is dialed and the dialing wheel 20 is released, an addition operation will be performed by transfer of voltage from one lamp 16 to another in a right hand direction as viewed in FIG. 1 until the lamp labeled by the solution numeral up to 39 is illuminated. After each addition operation, the last lamp illuminated signifying the solution or the sum will remain illuminated. Similarly, a subtraction operation is performed by first displacing the switch 24 to the "subtract" position. Indicator lamp 28 will be continuously illuminated. The dialing mechanism is then operated in order to select the number of pulses representing the quantity to be subtracted. Each time a contact associated with the dialing mechanism 18 is closed, a voltage drop occurs across the subtract coil 52 of the stepping switch assembly 46 in order to advance it one position. It will also be apparent that the addition and subtraction operations are limited by the number of indicator lamps 16 employed, this number being designed to match the capacity of the children being instructed or trained.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An arithmetic educational device comprising, a series of indicator lamps each having an energized and a deenergized condition, a dialing mechanism, a source of voltage connected to the dialing mechanism for generating a selected number of energizing pulses, switch means connecting said source of voltage to the indicator lamps for illumination thereof, operational control means connecting the dialing mechanism to the switch means for advancement thereof by an amount determined by the number of pulses generated by the dialing mechanism to sequentially transfer voltage from the source between the indicator lamps.

2. The combination of claim 1 wherein said switch means includes a plurality of contacts respectively connected to said indicator lamps, a contact arm connected to said source and engageable with said contacts, and a pair of stepping coils intermittently pulsed for advancement of the contact arm in opposite directions.

3. The combination of claim 2 wherein said operational control means includes a reversing switch device displaceable between two operative positions respectively connecting the dialing mechanism to said stepping coils.

4. The combination of claim 3 including add and subtract indicators respectively energized upon displacement of the reversing switch device to said operative positions thereof.

5. An arithmetic educational device comprising a panel, a series of numeral indicators mounted on the panel, a source of voltage, step switch means connecting the source to the indicators for sequential energization thereof, means connected to the source for generating a preselected number of pulses, and directional control means connected to the pulse generating means for transmitting said preselected number of pulses to the switch means causing advancement thereof in one of two directions to perform addition or subtraction operations displayed by the indicators.

6. The combination of claim 5 wherein said switch means includes a plurality of contacts respectively connected to said indicators, a contact arm connected to said source and engageable with said contacts, and a pair of stepping coils intermittently pulsed for advancement of the contact arm in opposite directions.

7. The combination of claim 6 wherein said directional control means includes a reversing switch device displaceable between two operative positions respectively connecting the dialing mechanism to said stepping coils.

8. The combination of claim 7 wherein said source of voltage includes transformer means supplying a relatively high voltage to the pulse generating means and a relatively low voltage to the indicators.

9. The combination of claim 5 wherein said source of voltage includes transformer means supplying a relatively high voltage to the pulse generating means and a relatively low voltage to the indicators.

* * * * *